J. T. Bartlett,

Railway Splice.

No. 96,769.  Patented Nov. 16, 1869.

Witnesses  J. T. Bartlett,
by his attorney

United States Patent Office.

JASON T. BARTLETT, OF BOSTON, MASSACHUSETTS, ASSIGNOR TO HIMSELF AND EDWARD E. BUTMAN, OF SAME PLACE.

Letters Patent No. 96,769, dated November 16, 1869.

IMPROVED RAILWAY-RAIL SPLICE.

The Schedule referred to in these Letters Patent and making part of the same.

*To all persons to whom these presents may come:*

Be it known that I, JASON T. BARTLETT, of Boston, of the county of Suffolk, and State of Massachusetts, have made a new and useful Invention, having reference to the Fishings of the Joints of Railways; and I do hereby declare the same to be fully described in the following specification, and represented in the accompanying drawings, of which—

Figure 1:
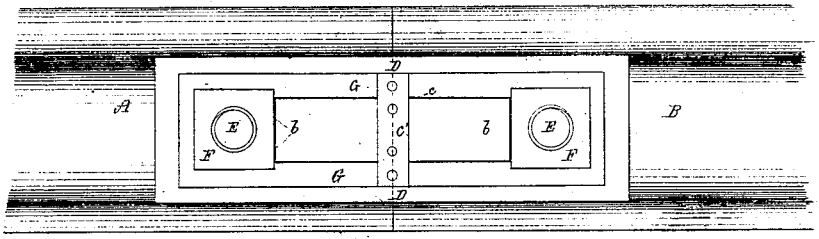

Figure 1 denotes a side elevation, and

Figure 2:
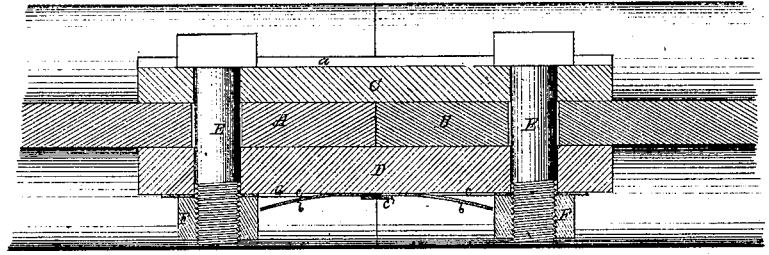

Figure 2, a horizontal section of a railway fishing or fished joint, provided with my invention.

Figure 3:
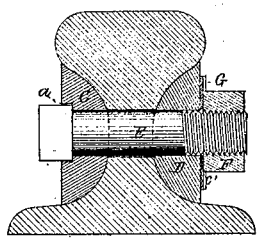

Figure 3 is a transverse section of the "fished joint," the plane of section being taken through one of the screw-bolts.

The purpose of the invention is to prevent the nuts of the bolts from being loosened or revolved back on their screws by the jar resulting from the passage of one or more railway-carriages across the joint or along the rails at the joint.

It is well known that the loosening of the nuts of the fishing-bolts from the cause above mentioned, is a source of much annoyance to railway-companies, and is frequently productive of, or liable to be the occasion of serious accident or damage.

The time and services of several workmen are usually daily required or consumed in setting up or tightening the nuts of the fishings of a first-class railway, and, consequently, an invention simpler in character, and practical in form and construction, and for the preservation of the nuts in their normal positions, becomes a desideratum.

The undersigned believes that he has made such an invention, one eminently advantageous in operation and cheap in construction and application, it being described as follows:

In the drawings—

A and B denote the contiguous parts of two rails, abutting against each other at their next adjacent ends, and connected by what is termed a fish-joint or jointing, which consists of two bars, C D, arranged on opposite sides of the rails and in the hollows thereof, two connection screw-bolts, E E, going through the bars and rails and nuts F F, which are screwed on the bolts.

The bolt-head fish C is furnished with a groove, *a*, made lengthwise through it, to receive the heads of the bolts, and fit to them, so as to prevent the bolts from revolving.

In carrying out my invention, I arrange, near to each of the nuts, a flat spring, *b*, and a recess, or chamber, *c*, into which the spring may be forced, so as to enable the nut to be revolved, the spring, when out of the chamber, resting with its end against the nut, in such manner as to prevent the nut from being revolved.

The drawings show a long plate, G, of metal, laid against the fish D, and provided with holes for the bolts to pass through, also with a long rectangular slot, extending from one nut to the other.

A double spring or bent piece of metal, fastened at its middle to a cross-piece, *c'*, riveted to the plate at its middle, constitutes the two springs, which, under ordinary circumstances, stand out of the slot, and, with respect to the nuts, in manner as represented in the drawings.

While the springs are in such positions, they prevent the nuts from being revolved on the screws, but by simply pressing each spring back into its recess or chamber, so as to cause the spring to pass out of the path of revolution of the nut, such nut may be turned on its screw.

Each spring or both springs may be struck up from a single plate, to be supported on either or each of the bolts, the space from which the spring may be taken constituting the chamber for its reception when forced backward, in order to enable the nut to be revolved.

I claim the described arrangement of the slotted plate, and its springs, with the screw-bolts and the nuts thereof, the plate under the said arrangement being supported on the bolts, and serving as an abutment or bearing for the nut or nuts.

JASON T. BARTLETT.

Witnesses:
R. H. EDDY,
S. N. PIPER.